Dec. 6, 1966 S. E. GITHENS, JR., ETAL 3,290,493

TRUNCATED PARALLEL MULTIPLICATION

Filed April 1, 1965 3 Sheets-Sheet 1

INVENTORS
SAMUEL E. GITHENS JR.
HENRY WYLE

BY A. M. Fernandez

ATTORNEY

TRUNCATED PARALLEL MULTIPLICATION

Filed April 1, 1965 3 Sheets-Sheet 2

INVENTORS
SAMUEL E. GITHENS JR.
HENRY WYLE
BY
A. M. Fernandez
ATTORNEY

INVENTORS
SAMUEL E. GITHENS JR.
HENRY WYLE
BY
A. M. Fernandez
ATTORNEY

United States Patent Office 3,290,493

Patented Dec. 6, 1966

3,290,493

TRUNCATED PARALLEL MULTIPLICATION

Samuel Ellisen Githens, Jr., Downey, and Henry Wyle, Garden Grove, Calif., assignors to North American Aviation, Inc.

Filed Apr. 1, 1965, Ser. No. 444,705
20 Claims. (Cl. 235—164)

This invention relates to a binary multiplication system, and more particularly to a system for multiplying by the most significant binary digit first and truncating the product with truncation error compensation.

In the normal system for multiplication, the multiplicand is added into the most significant half of the accumulator according to the multiplier digits which are examined one at a time in increasing order of significance as the partial product in the accumulator is shifted to the right. Thus at each step the complete partial product is formed by adding the multiplicand to the contents of the accumulator which is then shifted one bit position to the right into a full length extension register from which the multiplier digits are shifted out one digit at a time as a double-length product is formed.

When double length precision is not required, as in most scientific and control applications, a rounded product is formed by storing or otherwise using only the most significant half of the product stored in the accumulator. It has been discovered that if double-length precision is not required, a significant saving in time may be achieved by multiplying the most significant binary digit of the multiplier first, shifting the multiplicand to the right, truncating the product, and rounding off in the normal manner by adding a binary digit one to the least significant binary digit position of the truncated product. If more precision is desired than a half length truncated product will provide, it is only necessary to extend the system for truncated parallel multiplication to a length required for the precision desired.

The primary object of this invention is to provide an improved system of fast multiplication wherein the multiplicand is shifted to the right and multiplication proceeds by adding the multiplicand to successively lower orders of the accumulator under control of the successively lower order multiplier digits starting with the most significant multiplier digit.

It is a further object to provide an improved system of multiplication wherein a truncated product is derived with a process of multiplying by the most significant digit of the multiplier first and shifting the multiplicand in a register of a length less than the number of digit positions required for a full double length product, but more than the number of digit positions desired in the truncated product.

Another object of the invention is to provide truncation error compensation for a truncated product derived with a process of multiplying by the most significant digit of the multiplier.

Still another object of the invention is to provide an improved apparatus for fast multiplication using an unassimiliated-carry adder.

These and other objects of the invention will become apparent from the following description in conjunction with the drawings in which.

Figure 1:
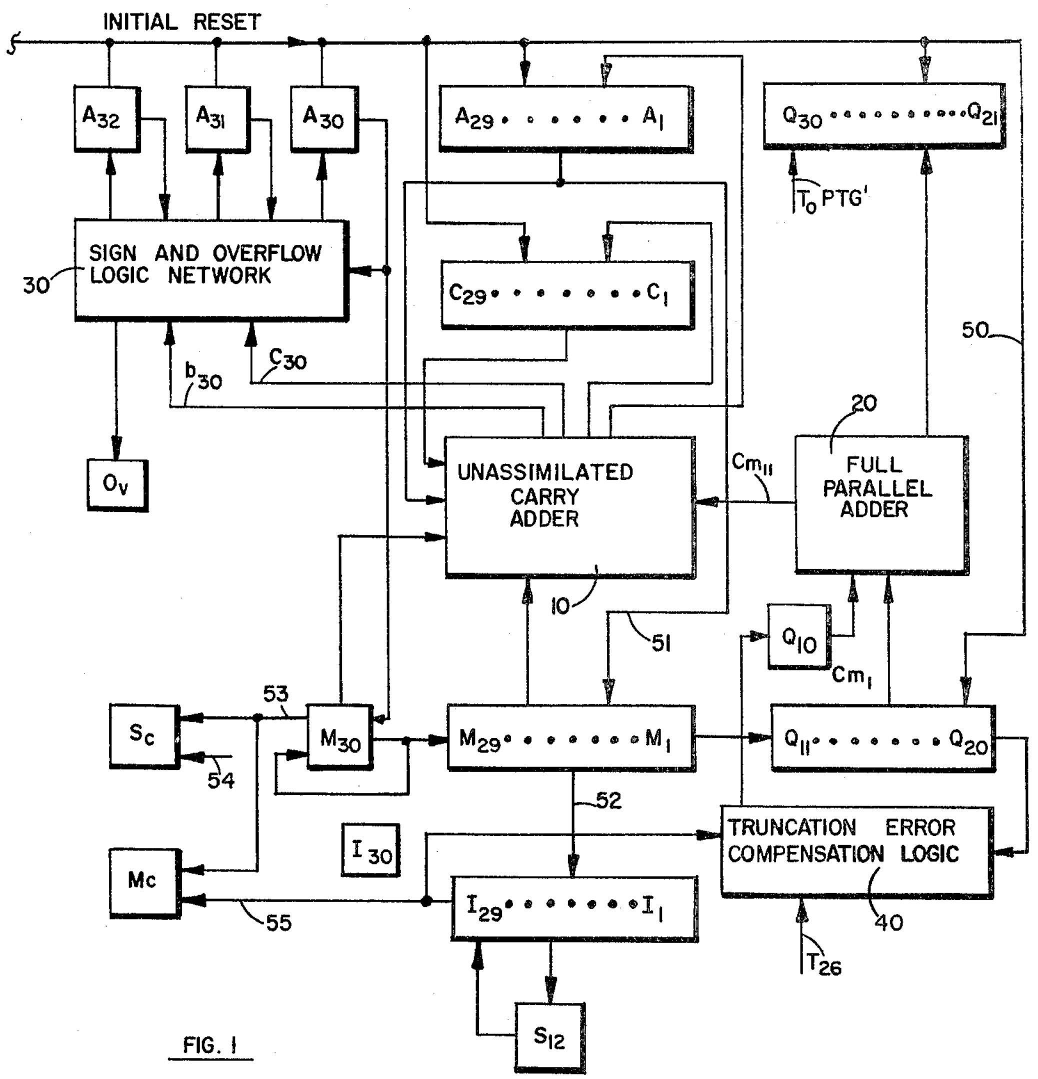
FIGURE 1 is a schematic diagram of a multiplication system constructed in accordance with the present invention.

A brief description of the organization of a computer in which the illustrative example of the invention is implemented will facilitate understanding the principles involved. The arithmetic unit illustrated in FIGURE 1 contains an accumulator comprising an A-register $A_1$ to $A_{32}$, a C-register $C_1$ to $C_{29}$ and an unassimilated-carry adder 10. An M-register $M_1$ to $M_{30}$ is provided to communicate with a memory not shown in FIGURE 1. Also included in the arithmetic unit is a Q-register of which only stages $Q_{10}$ to $Q_{30}$ are shown. An I-register $I_1$ to $I_{30}$ provided to receive instructions directly from memory is time shared for both multiplication and division.

The A-register holds the augend or minuend before and the sum or difference after addition or subtraction. It initially holds the multiplicand or dividend before and the product or quotient after multiplication or division.

The M-resgister holds the added or subtrahend during addition or subtraction. It holds the multiplicand or divisor during multiplication or division. M-register is also employed for all data transfers to the A, Q and I-register from memory, except instructions which are transferred directly to the I-register from memory.

The Q-register is employed during certain control operations, such as the execution of a transfer of control command, and some arithmetic operations. During division, the Q-register is employed to develop the quotient. It is also employed during multiplication, but in three independent parts: stages $Q_{30}$ to $Q_{21}$ as an extension register for the accumulator; stages $Q_{11}$ to $Q_{20}$ as an extension for the M-register; and stage $Q_{10}$ as a buffer flip-flop.

The I-register, which receives the instructions, is also employed to hold the multiplier in stages $I_1$ to $I_{29}$ during multiplication and to develop the quotient during division. During multiplication, the multiplier is shifted to the left into a control flip-flop *Mc* one digit at a time as multiplication proceeds by the shift-add method starting with the most significant digit. The sign of the multiplier is transferred directly into a control flip-flop *Sc*, instead of into the stage $I_{30}$ at the initial time $T_0$ of the multiplication process.

If the sign digit is equal to 1, the multiplier is a negative number in the 2's complement form and the product developed by the shift-add method requires the multiplicand to be subtracted from the most significant part thereof as a correction. That is accomplished by first adding the 2's complement of the multiplicand to the contents of the accumulator under control of the multiplier sign at time $T_1$ after the accumulator has been initially reset to zero at time $T_0$.

A buffer flip-flop $S_{12}$ is provided to store the least significant multiplier digit at time $T_{27}$ which, as will be explained, is six clock times before the multiplication process is complete. A bit time is a unit of time the computer requires to make complete one addition, or subtraction, of the contents of the M-register to, or from, the accumulator in the unassimilated carry form. In that manner, all positions of the I-register except $I_{29}$ are cleared to receive the next instruction at time $T_{27}$. This is advantageous in the illustrative embodiment which employs a memory having an excess cycle of six bit times because it is desirable to have the next instruction ready for execution as soon as multiplication is complete. This is particularly advantageous in this embodiment because, as will be more fully explained hereinafter, the product in the accumulator has unassimilated carries in the C-register which must be assimilated (added to the contents of the A-register) before the next instruction may be executed if the product is required to be in the assimilated form, as for an instruction to store the product in memory. Thus, the operation to read the next instruction begins at time $T_{28}$ of multiplication. The bit position $I_{29}$ is not used for instructions so that the least significant bit of the multiplier may be shifted into the control flip-flop $Mc$ through bit position $I_{29}$ in the normal manner. If bit position $I_{29}$ were to also be used for instructions, an additional buffer flip-flop could be provided between the flip-flop $S_{12}$ and the control flip-flop $Mc$.

As noted hereinbefore, stage $I_{30}$ is not used during multiplication because the sign of the multiplier is transferred directly into the control flip-flop $Mc$ from the flip-flop $M_{30}$ at time $T_0$. It is also transferred into the control flip-flop $Sc$ at the same time.

The multiplication process may be described in general terms. Consider first that the multiplicand X and multiplier Y are 30 bit binary numbers including sign, each a fraction between $-1$ and $+1-e$, where $e$ is equal to $2^{-29}$, and that the negative numbers are represented in the 2's complement form. Then the multiplicand, multiplier and product may be expressed as follows:

$$X=-M_{30}+M_{29}2^{-1}+M_{28}2^{-2}+\ .\ .\ .\ M_{1}2^{-29}$$
$$Y=-I_{30}+I_{29}2^{-1}+I_{28}2^{-2}+\ .\ .\ .\ I_{1}2^{-29}$$
$$XY=-XI_{30}+XI_{29}2^{-1}+XI_{28}2^{-2}+\ .\ .\ .\ XI_{1}2^{-29}$$

From that it may be seen that multiplication may be performed by the shift-add method starting with the most significant multiplier digit with the following sequence of operations:

(1) Form $-XI_{30}$ by adding the 2's complement of the multiplicand after first setting the accumulator equal to zero, thereby effectively entering the 2's complement of the multiplicand in the accumulator if the sign $I_{30}$ of the multiplier (actually never stored in bit position $I_{30}$ but entered directly into the $Sc$ and $Mc$ control flip-flop) is negative.

(2) Shift the multiplicand right one bit position to divide it by two and shift the multiplier to the left one bit position to enter the most significant multiplier digit in the control flip-flop $Mc$.

(3) Add the multiplicand to the accumulator if the most significant multiplier digit $I_{29}$ is a bit one.

(4) Repeat steps 2 and 3 for each successively lower multiplier digits $I_{28}$ to $I_1$.

Thus, the first partial product will either be zero or the 2's complement of the multiplicand, depending upon whether the sign of the multiplier is positive (0) or negative (1). The necessity for adding the 2's complement when a negative multiplied is employed in the 2's complement form is explained at page 161 by R. K. Richards in "Arithmetic Operations in Digital Computers" published by D. Van Nostrand Company (1955).

Steps 2 and 3 are performed simultaneously (during the same bit time by shifting the multiplicand to the right and copying the sign into the vacated positions $M_{29}$, $M_{28}$ . . . from bit position $M_{30}$. If the multiplicand is negative, the negative sign (1) copied into successively lower bit positions of the M-register are added to the partial product, in response to multiplier digits, thereby effectively adding the 2's complement of the multiplier to the most significant half of a full length product to correct for the error introduced by dealing with a negative multiplicand in the 2's complement form. Dr. Richards points out the need for that correction also.

The advantage of proceeding from the most significant binary digit of the multiplier in accordance with the present invention is that a truncated product may be readily achieved. Consider the following example of a full-length product developed in a double-length register.

| | |
|---|---|
| 0.0101 | Multiplicand (M-register) |
| 0.0111 | Multiplier (I-register) |
| 0.0000 | |
| 0.00101 | |
| 0.000101 | |
| 0.0000101 | |
| 0.0100011 | Full-length product |

The full product may be rounded to half length in the usual manner by discarding the unwanted least significant digits and adding a bit 1 in the least significant bit position of the wanted digits as follows:

| | |
|---|---|
| 0.0100011 | Full-length product |
| 1 | Round off bit |
| 0.0101 | Rounded product |

If 5-bit registers are employed for the multiplicand and the products, a truncated product is produced as follows:

| | |
|---|---|
| 0.0101 | |
| 0.0111 | |
| 0.0000 | |
| 0.00101 | |
| 0.000101 | |
| 0.0000101 | |
| 0.0011 | Truncated product |
| 1 | Round-off bit |
| 0.0100 | Rounded product |

The truncation error of 0.0001011 in this simple example is relatively large since only four significant bit positions are employed for the numbers instead of the usual twenty to forty. However, such a simple example serves to illustrate the source of the error introduced by truncation which is the loss of carries which should be produced by the least significant multiplicand digits shifted out of the M-register and which should be added to the retained portion of the product.

It has been discovered that a virtual elimination of the truncation error may be achieved by providing a buffer flip-flop $Q_{10}$ in FIGURE 1 to store discarded multiplicand binary digits $M_1$, $M_2$, $M_3$ . . . and add them to the least significant bit position of the truncated product during successive iterations of the shift-add operation, but only if the multiplier digit is a binary 1. To illustrate, consider the same example with this truncation error compensation as follows:

| | |
|---|---|
| 0.0101 | (M) |
| 0.0111 | (I) |
| 0.0000 | (A) |
| 0.00101 ⌐ | (M) |
| 1 ← | $(Q_{10})$ |
| 0.0011 | (A) |
| 0.00010 ⌐ | (M) |
| 0 ← | $(Q_{10})$ |
| 0.0100 | (A) |
| 0.00001 ⌐ | (M) |
| 1 ← | $(Q_{19})$ |
| 0.0101 | Truncated pooduct |

The truncation error in this simple example is reduced to zero, but that is not always the result if the numbers to be multiplied are selected at random. However, it may be shown that statistically the truncation error is reduced on the average to the same order of magnitude as the average round-off error in a conventionally achieved, rounded product by inhibiting the addition of $Q_{10}$ to the least significant bit position of the truncated sum of partial products during any one of the iterations. However, the truncation error of a given product is of course equal to the magnitude of the last retained bit.

To reduce the truncation error of a given product, multiplication may be carried out to a larger number of places, and then rounded off. A 10-bit extension is provided for the 30-bit accumulator (A and C-registers) and the 30-bit M-register in the illustrative embodiment of the invention. The Q-register not otherwise used during multiplication is used for that purpose, together with a 10-bit parallel adder 20.

Since the adder 20 is a 10-bit parallel adder only, it need not be an unassimilated-carry adder; instead propagation of carries may be speeded by either provising simultaneous generation of all carries or sequential propagation of carries in groups. In the preferred embodiment, the carries are simultaneously generated in the least significant five places and the carry out of the fifth place is transmitted to the remaining places for the simultaneous generation of all remaining carries. R. S. Ledley describes such a method of reducing carry propagation time at page 522 of "Digital Computers and Control Engineering" published by McGraw-Hill (1960).

Once the more accurate truncated product has been formed using the extension registers, the product thus obtained may be stored, as by placing the contents of the extension to the A-register ($Q_{30}$ to $Q_{21}$) in one memory location and the more significant part in another memory location by programming. However, in the usual case a rounded product of the computer word length of 30 binary digits, including sign, is desired. That may be accomplished by discarding the contents of the extension to the A-register and rounding off by adding a bit 1 in the least significant position ($A_1$) of the retained portion of the product. Adding the round off bit is accomplished in the preferred embodiment of the invention by initially setting the most significant bit position $Q_{30}$ of the extension to the A-register equal to 1, thereby effectively adding a carry as a round off bit in the least significant bit position of the product in the accumulator (A and C-registers). If a rounded product is not desired, the initial setting of the most significant bit position of the extension to the A-register is inhibited as by a Tag bit in the multiply instruction.

A logic network 30 is provided to compute the sign and detect an overflow. The sign position $A_{30}$ of the A-register and two additional stages $A_{31}$ and $A_{32}$ are provided to extend the range of the accumulator because the limited range ($-1$ to $+1-e$) of the stages $A_1$ to $A_{30}$ may be temporarily exceeded due to the use of an unassimilated carry adder. In other words, although the multiplication of any two numbers will not produce an overflow in the final product, an overflow may be produced in an unassimilated final product or partial product. Accordingly, the logic network 30 will be described herein for the purpose of completing the description of the arithmetic unit. It is, of course, possible to cause an overflow in the final product while forming the sum of products, as by leaving a first product in the accumulator at time $T_0$ of a succeeding multiplication operation.

Before proceeding with a detailed description of the invention and the logic design of a preferred embodiment, a review of the truncation error compensation and a discussion of the magnitude of the error being compensated will assist in understanding the invention.

If multiplication is carried out by the shift-add method, starting with the most significant digit of the multiplier in a system where the partial products are retained in a fixed length register, and the multiplicand is shifted to the right in a register of the same length, a truncation error results as illustrated by simple examples hereinbefore. To determine the magnitude of that error, let A and B be two $n$ bit positive binary numbers represented by $$A=\sum_{i=1}^{n} a_i 2^{-i},\quad B=\sum_{i=1}^{n} b_i 2^{-i}$$

Their product is then given by $$A\cdot B=\sum_{i=2}^{n}\sum_{j=1}^{i-1} a_j b_{i-j} 2^{-i}+\sum_{i=1}^{n}\sum_{j=0}^{n} a_{i+j} b_{n-j} 2^{-(n+i)}$$

Thus an accumulator $2n$ bits long would be required to develop the full double length product A·B. If an accumulator $n+s$ bit is employed, where $s$ is less than $n$, the resulting truncation error is given by $$R=\sum_{i=s+1}^{n}\sum_{j=0}^{n} a_{i+j}\, b_{n-j} 2^{-(n+i)}$$

Assuming that each digit $a_i$ and $b_i$ is a random variable with a density function given by $$f(0)=\tfrac{1}{2},\ f(1)=\tfrac{1}{2}$$

it can be shown that the mean of the truncation error R is given by $$\mu=(n-s-1)2^{-(n+s+2)}+2^{-2(n+1)}$$

and that for large values of $n-s$ the variance of the truncation error R may be approximated by $$\sigma=2^{-n-s-2}(\tfrac{1}{3})\sqrt{21(n-s)-31}$$

When $n$ is equal to $s$, it is obvious that both $\mu$ and $\sigma$ are zero. However, for a computer having a word length of 30 bits, for example, a 60-bit accumulator would be impractical, particularly since only a 30-bit rounded product is usually required. Expansion of the accumulator from 30 to 40 bits will provide a substantial reduction of the truncation error, but on the average some error still remains, even for a 30-bit rounded product. The truncation error compensation method of the present invention will virtually eliminate the error by a unique error compensation method.

In order to facilitate the formulation of a mathematical description or statement of the truncation error compensation method, the multiplier, multiplicand and product are defined as follows:

$$\text{Multiplier } (a)=a_1 2^{-1}+a_2 2^{-2}\ \ldots\ a_{29} 2^{-29}$$

$$\text{Multiplicand } (b)=b_1 2^{-1}+b_2 2^{-2}\ \ldots\ b_{29} 2^{-29}$$

$$\text{Product}=\sum_{j=1}^{29}\sum_{i=1}^{29} a_i b_j 2^{-(i+j)}$$

where the subscripts refer to the bit positions of the numbers in decreasing order of significance (1, 2, 3, . . . 29) instead of increasing order of significance (29, 28, 27, . . . 1). The subscripts 30, 31, 32 . . . 39 relate to the product digits in the respective bit positions $Q_{30}$, $Q_{29}$, $Q_{28}$ . . . $Q_{21}$ of the extension to the A-register and to the multiplicand bit positions $Q_{11}$, $Q_{12}$, $Q_{13}$ . . . $Q_{20}$ of the extension to the M-register. The following table will clarify this inverse numbering system for the multiplicand.

| S | 1 | 2 | 3 | 4 | 5 . . . | 27 | 28 | 29 | 30 | 31 . . . | 39 |
|---|---|---|---|---|---|---|---|---|---|---|---|
| $M_{30}$ | $M_{29}$ | $M_{28}$ | $M_{27}$ | $M_{26}$ | $M_{25}$ | $M_3$ | $M_2$ | $M_1$ | $Q_{11}$ | $Q_{12}$ | $Q_{20}$ |

The truncation error incurred using an extension register is given by $$\Delta T=2^{-(30+s)}\sum_{i=s+1}^{29} a_i b_{40-1}+2^{-(31+s)}\sum_{i=s+2}^{29} a_i b_{41-i}$$

$$+2^{-(32+s)}\sum_{i=s+3}^{29} a_1 b_{42-i}\ldots+2^{-(47+s)}\sum_{i=s+18}^{29} a_i b_{57-i}$$

$$+2^{-(48+s)}\sum_{i=s+19}^{29} a_i b_{38-i}\Delta T=\sum_{j=s+1}^{29}\sum_{i=j}^{29} a_1 b_{29-i+j} 2^{-(29+j)}$$

where $s$ is the number of bit positions of the extension register which is equal to 10 for the illustrative embodiment of the invention. Truncation error compensation consists of adding each of the product $$a_{s+1}b_{29},\ a_{s+2}b_{28},\ \ldots\ ,\ a_{28}b_{s+2},\ a_{29}b_{s+1}$$

into the least significant bit position ($Q_{21}$) of the 10-bit extension register. A truncation error compensation network 40 is provided for that purpose. The error incurred is then $$\Delta R=2^{-(29+s)}\sum_{i=s+1}^{29}a_ib_{40-i}-\sum_{i=s+1}^{29}\sum_{i=j}^{29}a_ib_{29-i+j}2^{-(29+i)}$$

The mean of this error for random $a_i$ and $b_i$ digits is $2^{-(31+s)}$ which may be virtually reduced to zero by not adding one of the terms $a_{s+1}b_{29}, \ldots, a_{29}b_{s+1}$. That may be accomplished by inhibiting the network 40 during the examination of, for example, the 26th multiplier bit.

A preferred embodiment of the invention will now be described in detail with reference to the schematic diagram of FIGURE 1, the timing diagram of FIGURE 2 and logic equations expressed in conventional AND/OR functions, but written for convenient implementation with NAND gates.

As noted hereinbefore, the method for handling negative multipliers is the same as for positive multipliers except that multiplicand is subtracted from the most significant half of the product as a correction. That could be accomplished either as a first or a final step, but since the multiplicand is being shifted to the right relative to the product one bit position for each iteration of the recursive process, the correction is accomplished as a first step while the multiplicand is in proper position. Thus with a negative multiplier the initial partial product is entered as the 2's complement of the multiplicand at time $T_1$. During the remaining times $T_2$ to $T_{30}$ the multiplicand is added if the multiplier bit being examined is a one. Otherwise the multiplier and multiplicand are shifted left and right respectively without addition.

Terms employed in the following detailed description are defined as follows:

$A_i$—ith stage of the A-register
$C_i$—ith stage of the C-register
$M_i$—ith stage of the M-register
$Q_i$—ith stage of the Q-register
$I_i$—ith stage of the I-register
$S_c$—sign control flip-flop, used to control addition and subtraction
$M_c$—magnitude control flip-flop, used to control magnitude of inputs to adders.
$b_i$—multiplicand inputs to adder controlled by $Sc$ and $Mc$
$Ov$—overflow indicator flip-flop
$S_{12}$—buffer flip-flop for last multiplier digit
ASA—Add/Subtract control for the A-register at times $T_1, T_2, \ldots T_{30}$
ADE—Reset A-register to zero at time $T_0$
ASC—Add/Subtract control for C-register at times $T_1, T_2, \ldots T_{30}$
CDE—Reset C-register to zero at time $T_0$ and enable zero-set logic for the C-register at times $T_1, T_2, \ldots T_{30}$
RSM—Right shift M-register at times $T_1, T_2, \ldots T_{30}$
MDE—Enable zero-set logic for the M-register
ATM—Transfer contents of A-register to M-register at time $T_0$
ASQ—Add control for the Q-register at times $T_2, T_3, T_4, \ldots T_{30}$
QDE—Reset Q-register to zero (except stage $Q_{30}$) at time $T_0$ and enable zero-set logic for the Q-register at times $T_1, T_2, \ldots T_{30}$
LSQ—Left shift Q-register at times $T_1, T_2 \ldots T_{30}$
MTQ—Shift $M_1$ to $Q_{11}$ and enable truncation error compensation logic network 40 at times $T_1$ to $T_{30}$
LSI—left shift I-register at times $T_1, T_2, \ldots T_{26}$
IDE—enable zero-set logic for I-register at times $T_0, T_1, T_2, \ldots T_{27}$
MTI—transfer multiplier to I-register at time $T_0$
MTS—transfer multiplier sign to control flip-flop $Sc$ and $Mc$ at time $T_0$
ITM$c$—shift successive multiplier digits from $I_{29}$ to the control flip-flop $Mc$ at times $T_1, T_2, \ldots T_{29}$
$ITS_{12}$—transfer multiplier digit from $I_{27}$ to $S_{12}$ at time $T_{27}$
$IFS_{12}$—transfer multiplier digit from $S_{12}$ to $I_{29}$ at time $T_{28}$
OSS$c$—one-set control flip-flop $Sc$ at time $T_1$ The timing signals $T_0, T_1, T_2, \ldots T_{30}$ are generated by a suitable counter (not shown) as soon as the instruction to multiply has been decoded by the sequence control unit (also not shown) of the computer. The sequence control unit initiates a multiply signal MUL when the timing signals are initiated. At the next clock time after time $T_{30}$, that signal is terminated.

Figure 2:
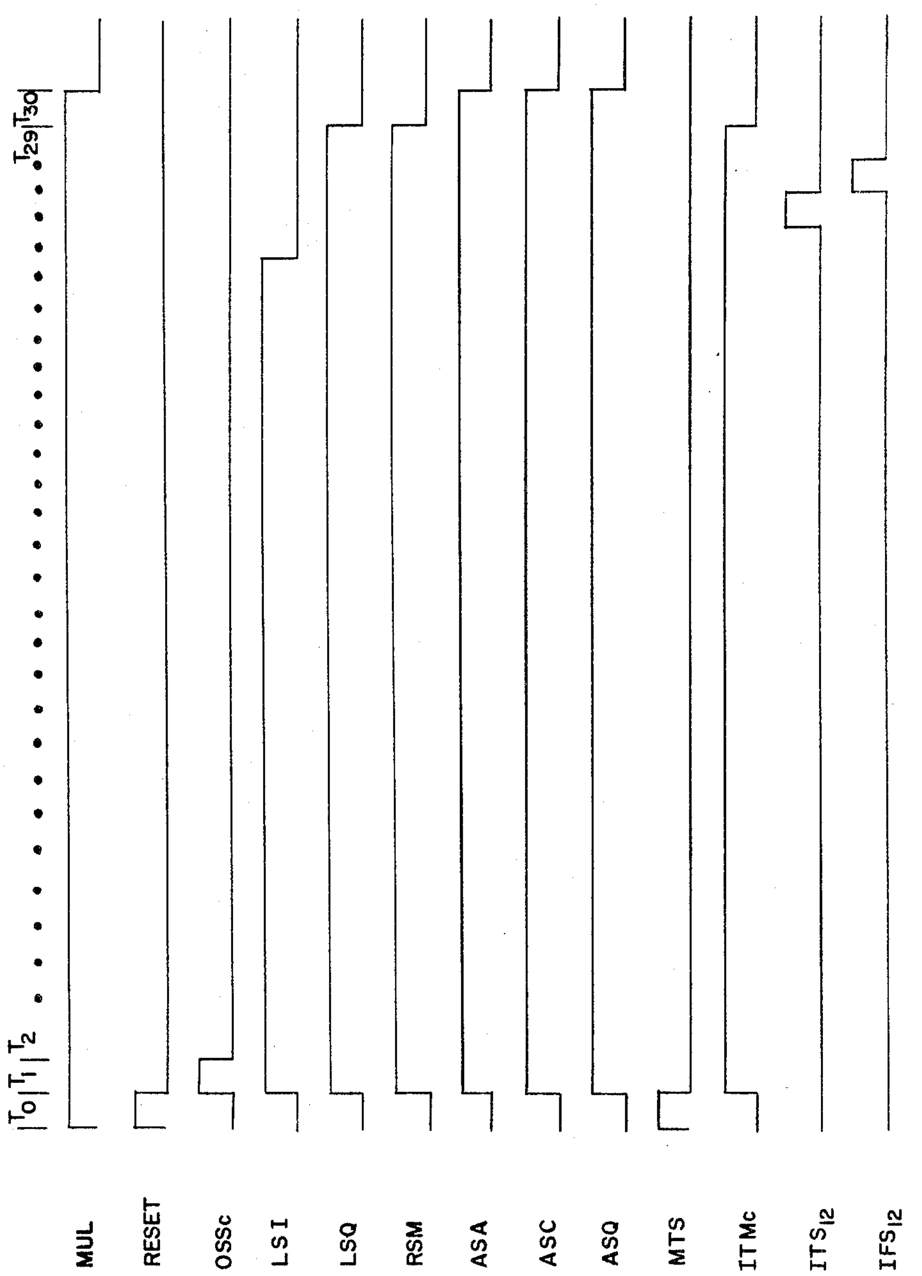
FIGURE 2 is a timing diagram for the operation of the multiplication system.

FIGURE 2 illustrates the timing of the more impotant ones of the foregoing control signals. A signal RESET at time $T_0$ is shown instead of the various control signals, such as ADE, CDE, and QDE, which function at time $T_0$ to initially reset certain registers. A line 50 in FIGURE 1 schematically illustrates that initial reset function. All other lines represent the various functions, such as a parallel transfer of the multiplicand from the A to the M-register and a parallel transfer of the multiplier from the M to the I-register over respective lines 51 and 52 at time $T_0$. The sign of the multiplier is transferred directly into the control flip-flops $Mc$ and $Sc$ over a line 53 at time $T_0$ instead of into the flip-flop $I_{30}$. At time $T_1$ the control flip-flop $Sc$ is one-set by the control signal ASS$c$ over a line 54. Thus the logic for the flip-flop $Sc$ may be expressed as follows:

$$_1Sc=M_{30}'T_0+OSSC$$
$$_0Sc=M_{30}T_0$$

The multiplier digits are sequentially transferred into the control flip-flop $Mc$ over a line 55 during clock times $T_1$ to $T_{29}$ under control of the signal ITM. Thus the logic for the flip-flop $Mc$ may be expressed as follows:

$$_1Mc=M_{30}T_0+I_{29}ITM$$
$$_0Mc=M_{30}'T_0+I_{29}'ITM$$

The control for the buffer flip-flop $S_{12}$ to bypass $I_{28}$ in order to be able to read in a new instruction as early as time $T_{28}$ is as follows:

$$_1S_{12}=I_{27}ITS_{12}$$
$$_0S_{12}=I_{27}'ITS_{12}$$

The bit position $I_{29}$ is not used for instructions; accordingly, the flip-flop $I_{29}$ is used to transfer multiplier digits to the control flip-flop $Mc$ until the end of the multipilcation in accordance with the logic $$_1I_{29}=I_{28}LSI+I_{28}T_{27}+S_{12}IFS_{12}$$
$$_0I_{29}=(I_{28}LSI+I_{28}T_{27})'IDE+S_{12}'IFS_{12}$$

The logic for the left-shift control of a given one of the flip-flops $I_1$ to $I_{27}$ is as follows:

$$_1I_i=I_{i-1}LSI$$
$$_0I_i=(I_{i-1}LSI)'IDE$$

Figure 3:
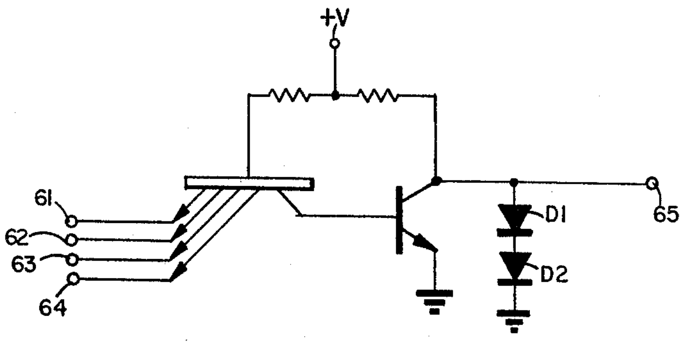
FIGURE 3 is a circuit diagram of a NAND gate used in the preferred embodiment of the invention.

FIGURE 3 illustrates a NAND gate circuit selected to implement the invention because of its simplicity, high speed and low power requirements. Its operation is as follows: When any one of the input terminals 61, 62, 63 and 64 is at ground level (±.35 volt) the output terminal 65 is at a positive level (1.75±.5 volt) equal to the sum of the voltage drops across two clamping diodes $D_1$ and $D_2$. Otherwise the output terminal 65 is at zero volts. Thus for the AND function all input signals must be true (positive) and the output function is the complement of that AND function. If the true function is desired, and inverting function must be provided, as by a cascaded NAND gate.

Figure 4:
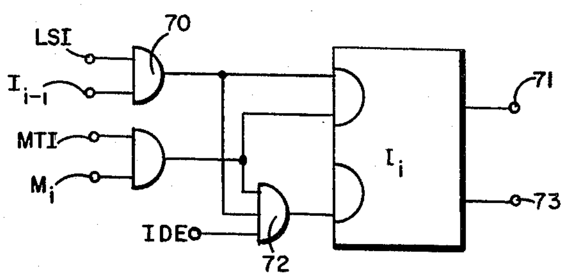
FIGURE 4 is a schematic diagram illustrating the manner in which NAND gates are employed to implement the logic design of the preferred embodiment of the invention.

FIGURE 4 illustrates the use of the control signal IDE to implement the foregoing logic for a given flip-flop $I_i$, assuming an RS flip-flop configuration with a two-input NAND gate on each side designed as an integral sort of the flip-flop. With the circuit of FIGURE 3 for the NAND gates, a bit 1 is defined as the positive voltage level (1.75±.5 volt) and a bit 0 as the ground level (±.35 volt). For a left shift operation, the control signals LSI and IDE are positive. If $I_{i-1}$ is also positive, the output of gate 70 is zero volts. With a zero-volt input signal $I_{i-1}$ to the true or "1" side of the flip-flop, a positive signal $I_i$ is produced at the output terminal 71 of the flip-flop $I_i$. When the input signal $I_{i-1}$ is zero volt, the output of the gate 70 is positive and the flip-flop is not set equal to one; instead, it is set equal to zero via gate 72 with the output terminal 73 of the flip-flop $I_i$ at a positive level ($I_i'=+1.75\pm.5$ volt).

Gate 74 is employed for the parallel transfer of the multiplier from the M-register to the I-register. It is enabled for that operation by the control signals MTI and IDE. Thus the control signal IDE allows the flip-flop $I_i$ to be employed as an RS flip-flop, but to be reset only when the control signal IDE is positive. Implementation of the logic equations in this manner permits the zero-set, or reset, equation to be mechanized with one gate instead of two.

The M-register is employed to store the multiplcand and, as noted hereinbefore, to communicate with the memory section (not shown) of the computer. Accordingly, in order to multiply with the A, M and I-registers, the multiplicand is first stored in the A-register under programmed control. The multiplier is then read from memory into the M-register under the control of the instruction to multiply. Once the multiplier has been read from memory into the M-register, execution of the instruction to multiply may be initiated. The first step of the operation is to transfer the multiplier into the I-register in accordance with the foregoing logic equations and to transfer the multiplicand from the A-register to the M-register in accordance with the following logic equations:

$${}_1M_i=A_iATM+M_{i+1}RSM$$
$${}_0M_i=[(A_iATM)'+(M_{i+1}RSM)']MDE$$

Where $_i=1, 2 \ldots 29$.

$${}_1M_{30}=A_iATM+M_{30}RSM$$
$${}_0M_{30}=[(A_iATM)'+(M_{30}RSM)']MDE$$

The transfer of the multiplicand to the M-register is under the control of the signal ATM which is produced at time $T_0$.

As multiplication proceeds from the most significant bit of the multiplier in the I-register to the least significant bit, the multiplicand is added to the contents of the accumulator (A- and C-registers) through the unassimilated carry adder 10. In the process, the multiplicand is shifted to the right one bit position for each iteration of the recursive process.

The control signal RSM produced during the times $T_1$ to $T_{30}$ controls the right shift of the multiplicand. The most significant bit position $M_{30}$ of the M-register receives the sign bit of the multiplicand when the contents of the A-register are transferred to the M-register under the control of the signal ATM at time $T_0$. Thereafter, as the multiplicand is shifted to the right in the M-register, the sign is shifted into the next lower bit position $M_{29}$ but the bit position $M_{30}$ is not cleared; instead the sign is recirculated into the flip-flop $M_{30}$ under the control of the right-shift control signal RSM. This has the effect of filling vacated positions of the M-register with the sign as the multiplicand is shifted to the right so that, when the multiplicand is negative, an error is not introduced by inserting a bit zero in the vacated positions of the M-register since negative numbers are represented in the 2's complement form. An example of multiplication for negative arguments will illustrate this and show how the unassimilated carry adder 10 employs the unassimilated carries in the C-register.

| | | | *Clock times* |
|---|---|---|---|
| M | 1. 1 0 0 1 1 | | |
| I | 1. 1 0 1 0 1 | | |
| A | 0. 0 1 1 0 1 | Add 2's complement of M | $T_0$ |
| C | 0.0 0 0 0 0 | | |
| M | 1 1.1 0 0 1 | | |
| A | 1 1 0 1 0 0 1 | Shift and add M | $T_1$ |
| C | 0.0 1 0 0 1 0 | | |
| M | 1 1 1.1 0 0 1 1 | | |
| A | 1 1 0 1 0 0 1 | Shift M | $T_2$ |
| C | 0.0 1 0 0 1 0 | | |
| M | 1 1 1 1.1 0 0 1 1 | | |
| A | 0 1 1 0 0 0 1 1 1 | Shift and add M | $T_3$ |
| C | 1.1 0 1 1 0 0 0 0 | | |
| M | 1 1 1 1.1 0 0 1 1 1 | | |
| A | 0 1 1 0 0 0 1 1 1 | Shift M | $T_4$ |
| C | 1.1 0 1 1 0 0 0 0 | | |
| M | 1 1 1 1 1 1.1 0 0 1 1 | | |
| A | 0 0 1 0 1 1 0 1 1 1 1 | Shift and add M | $T_5$ |
| C | 1.1 1 1 0 0 1 0 0 0 0 | | |
| A | 0. 0 0 1 0 0 0 1 1 1 1 | Assimilate carries | $T_6$ to $T_{11}$ |

In the foregoing example, multiplication without truncation is illustrated to facilitate understanding the basic algorithm employed. The first step is to add the 2's complement of the multiplicand for the correction required due to the negative multiplier represented in the 2's complement form. Accordingly, at the first clock time $T_0$, the number 0.01101 is entered into the A-register in response to the bit 1 in the sign position of the multiplier.

Scanning the multiplier from left to right, the next digit is a bit 1. Accordingly, the multiplicand is shifted to the right one bit position and added to the contents of the accumulator. The psuedo sum 1101001 is stored in the A-register and the unassimilated carries 0010010 in the C-register.

At the third clock time $T_3$, a multiplier digit 0 causes the multiplicand to be shifted, but not added; instead zero is effectively added to the contents of the accumulator. The second and third steps are repeated during the fourth and fifth clock times. During the sixth clock time $T_6$, the least significant bit 1 of the multiplier causes the multiplicand to be shifted to the right for the last time and added to the contents of the accumulator.

Since numbers having only six binary digits including sign have been employed in the example, multiplication is complete after the clock time $T_6$. However, to obtain the complete assimilated product, it is necessary to add the unassimilated carries in the C-register to the psuedo product in the A-register. That requires about six clock periods so that at time $T_{12}$, the complete product is formed.

It should be noted that in the example, the unassimilated carries in the C-register are displaced one bit position to the left of the A-register because during each step of addition, the unassimilated carry added 10 forms the psuedo sum of the addend and the augend according the functions $${}_1A_i=A_i'C_iM_i'+A_i'C_i'M_i+A_iC_i'M_i'$$
$${}_0A_i=A_iC_i'M_i+A_iC_iM_i'+A_i'C_iM_i$$

while the unassimilated carries are formed according to the functions $${}_1C_{i+1}=A_iC_i+A_iM_i+C_iM_i$$
$${}_0C_{i+1}=(A_iC_i+A_iM_i+C_iM_i)'$$

It should also be noted that these are general logic equations, and not the specific equations implemented in the illustrative embodiment of the invention.

In implementing the foregoing general logic equations for the unassimilated adder, control signals are combined with the addend $M_i$ in the adder 10 according to the following functions $$b_i=M_iScMc+M_i'Sc'Mc$$
$$b_i'=M_iSc'Mc+M_i'ScMc+ScMc'(ASST_1)+ScMc'(ASST_6)$$

The new signals $b_i$ and $b_i'$ are then substituted for the respective terms $M_i$ and $M_i'$. It should be noted that the last terms $A_i C_i' M_i$ and $A_i' C_i M_i$ for ${}_1A_i$ and ${}_0A_i$ are unnecessary and therefore not implemented in the specific illustrative embodiment of the invention.

To form the complete product, the unassimilated carry digits $C_i$ are combined with the psuedo product digits $A_i$ in response to a sequence control signal ASS. That is accomplished in three steps. First, zero is added to the accumulator and second, carries are propagated to appropriate orders of the C-register by the simple rule of setting $C_i$ equal to one if the next lower orders $C_{i-1}$ and $A_{i-1}$ are both equal to one, or if $A_{i-1}$ is equal to one and $C_{i-1}$ is being set equal to one as a result of a carry to the order of $C_{i-1}$ according to the following function $${}_1C_i=(C_{i-1}+{}_1C_{i-1})A_{i-1}$$

This function, known as the ripple function, requires four clock times for a 29-bit C-register, where a clock time is equal to one microsecond, because of the term ${}_1C_{i-1}$ which may in the extreme case require a carry to ripple from the least significant position to the most significant position. A more complete description of a preferred embodiment of this ripple carry function may be found in a copending U.S. application Serial No. 287,831, filed June 14, 1963, by R. K. Booher and assigned to the assignee of the present application.

In the third step, after the carry digits $C_i$ have been properly set according to the foregoing ripple function, the true product digits $A_i$ are formed in the A-register in one clock time by simply forming the exclusive- or of the contents of the A- and C-registers in accordance with the following functions $${}_1A_i=A_i'C_i+A_iC_i'$$
$${}_0A_i=A_iC_i$$

Here again there is a term $A_iC_i'$ which is unnecessary and not actually implemented. The remaining terms are provided by the logic network of the adder 10 which affects the operation of adding zero to the accumulator by forming $b_i$ to be equal to zero during the first and last steps of assimilation at times $T_1$ and $T_6$ of ASS, which is at times $T_7$ and $T_{12}$ of the foregoing example.

The total time required to assimilate the carry digits is six clock periods. Thus, multiplication requires only one clock time per multiplier bit, including the sign, plus six clock times for assimilation of the carries.

For some operations, advantage may be taken of the fact that the psuedo product and assimilated carries together represent the correct product and, if left unassimilated, are in proper form for a following arithmetic operation in which a quantity is to be added or subtracted, such as in forming the sum of products $ab+cd+ef$ . . . in the manner suggested hereinbefore. Therefore, in the illustrated embodiment of the invention, the assimilated product is not formed at the end of the multiply instruction; instead assimilation is affected at the beginning of the next instruction execution in response to a sequence control signal ASS if the next instruction requires the carries to be assimilated, such as an instruction to store the contents of the accumulator in a memory location.

Three indicator digits $A_{32}$, $A_{31}$, $A_{30}$, are used to store the sign and range of the accumulator. The A-register and C-register have been organized such that the value $Acc$ of the accumulator during the non-assimilated mode of operation is represented by:

$$Acc=-A_{32}(2^{+2})-A_{31}(2^{+1})+A_{30}(2^0)+(A_{29}+C_{29})2^{-1}+\ . \ . \ .\ (A_1+C_1)2^{-29}$$

The functions of the indicator digits and the resultant range of the accumulator after addition are indicated by the following table.

| $b_{30}$ | $A_{32}$ | $A_{31}$ | $A_{30}$ | $C_{30}$ | $A_{32}$ | $A_{31}$ | $A_{30}$ | Ov |
|---|---|---|---|---|---|---|---|---|
| 0 | 0 | 0 | 0 | 0 | 0 | 0 | 0 | 0 |
| 0 | 0 | 0 | 0 | 1 | 0 | 0 | 1 | |
| 0 | 0 | 0 | 1 | 0 | 0 | 0 | 1 | |
| 0 | 0 | 0 | 1 | 1 | 0 | 0 | 0 | 1 |
| 0 | 0 | 1 | 0 | 0 | 0 | 1 | 0 | |
| 0 | 0 | 1 | 0 | 1 | 0 | 1 | 1 | |
| 0 | 0 | 1 | 1 | 0 | 0 | 1 | 1 | |
| 0 | 0 | 1 | 1 | 1 | 0 | 0 | 0 | |
| 0 | 1 | 0 | 0 | 0 | 1 | 0 | 0 | x |
| 0 | 1 | 0 | 0 | 1 | 1 | 0 | 1 | |
| 0 | 1 | 0 | 1 | 0 | 1 | 0 | 1 | |
| 0 | 1 | 0 | 1 | 1 | 0 | 1 | 0 | |
| 0 | 1 | 1 | 0 | 0 | 1 | 1 | 0 | x |
| 0 | 1 | 1 | 0 | 1 | 1 | 1 | 1 | x |
| 0 | 1 | 1 | 1 | 0 | 1 | 1 | 1 | x |
| 0 | 1 | 1 | 1 | 1 | 1 | 0 | 0 | x |
| 1 | 0 | 0 | 0 | 0 | 0 | 1 | 1 | |
| 1 | 0 | 0 | 0 | 1 | 0 | 0 | 0 | |
| 1 | 0 | 0 | 1 | 0 | 0 | 0 | 0 | |
| 1 | 0 | 0 | 1 | 1 | 0 | 0 | 1 | |
| 1 | 0 | 1 | 0 | 0 | 1 | 0 | 1 | |
| 1 | 0 | 1 | 0 | 1 | 0 | 1 | 0 | |
| 1 | 0 | 1 | 1 | 0 | 0 | 1 | 0 | |
| 1 | 0 | 1 | 1 | 1 | 0 | 1 | 1 | |
| 1 | 1 | 0 | 0 | 0 | 1 | 1 | 1 | x |
| 1 | 1 | 0 | 0 | 1 | 1 | 0 | 0 | x |
| 1 | 1 | 0 | 1 | 0 | 1 | 0 | 0 | 1 |
| 1 | 1 | 0 | 1 | 1 | 1 | 0 | 1 | |
| 1 | 1 | 1 | 1 | 0 | 1 | 1 | 1 | x |
| 1 | 1 | 1 | 0 | 1 | 1 | 1 | 1 | x |
| 1 | 1 | 1 | 1 | 0 | 1 | 1 | 0 | x |
| 1 | 1 | 1 | 1 | 1 | 1 | 1 | 1 | x |

An "$x$" in the O$v$ column indicates that an overflow condition is defined, but as explained hereinafter, those overflow conditions need not be detailed; only those overflow conditions indicated by an "1" in the O$v$ column are detected. It is necessary for the A-register to have a range of values of $-2$ to $+1-2^{-29}$ during the unassimilated carry mode of operation. This is necessary for proper storage of the unassimilated carries and for overflow analysis before carries are assimilated. Examination of the right side of the foregoing table will indicate the overflow conditions.

The flip-flops $A_{30}$, $A_{31}$ and $A_{32}$ are assigned the respective weighted values of $+1$, $-2$ and $-4$. The carry $C_{30}$ to the sign bit position $A_{30}$ is assigned the same weighted value as the sign bit position $A_{30}$. The addend digit $b_{30}$ derived from the sign of the multiplicand in bit position $M_{30}$ has a weighted value of $-1$ since a bit 1 in that position represents a negative member in the 2's complement form. Thus at any time before assimilation of the carries, the range of the number in the accumulator can be determined by examining the indicator digits. An overflow is detected if the algebraic sum of the weighted indicator digits exceed the range $-2$ to $+2-2^{-29}$. In the foregoing table, all possible combinations of the digits $b_{30}$, $A_{32}$, $A_{31}$, $A_{30}$ and $C_{30}$ have been tabulated. However, only two overflow conditions are of interest, during and add/subtract operation as defined by the following logic function $${}_1Ov=b_{30}'A_{32}'A_{31}'A_{30}C_{30}ASC+b_{30}A_{32}A_{31}'A_{30}C_{30}'ASC$$

where $$C_{30}=A_{29}C_{29}+A_{29}b_{29}+C_{29}b_{29}$$

It is not necessary to mechanize an overflow detection for the other conditions since the value of the indicator digits for the other conditions is already outside the acceptable range by more than the sum of $A_{30}$, $b_{30}$ and $C_{30}$, and consequently overflow will already have been detected.

During assimilation of carries in the accumulator, overflow will be detected if the value of the accumulator exceeds the range of $-1$ to $+1-2^{-29}$ at the last clock time $T_6$ of assimilate control ASS. At that time all the positive carries have been rippled to the digit positions $A_{30}$, $A_{31}$ and $A_{32}$. The logic function for that overflow detection is $${}_1Ov=A_{31}A_{30}'(T_6ASS)+A_{31}'A_{30}(T_6ASS)$$

Additional overflow detection is provided for other operations which do not relate to this invention and are therefore not described here, such as left shift and divide operations.

Complete implementation for operation of the unassimilated carry added 10 and the sign and overflow logic network 30, after initialization at time $T_0$ is indicated by the following NAND logic equations:

$${}_1A_i=A_i'C_i'b_iASA+A_i'C_ib_i'ASA$$
$${}_0A_i=A_iC_i'b_iASA+A_iC_ib_i'ASA$$
$$b_i=M_iScMc+M_i'Sc'Mc$$
$$b_i'=M_i'ScMc+M_iSc'Mc+Mc'$$
$${}_1C_1=Sc'McASC+Cm_{11}McASQ$$
$${}_1C_0=Sc(ASC)(ASQ)'Mc'+Cm_{11}'Sc'McASQ$$
$${}_1C_{i+1}=(A_iC_i+A_ib_i+C_ib_i)ASC$$
$${}_0C_{i+1}=[(A_iC_i+A_ib_i+C_ib_i)ASC]'CDE$$
$${}_1A_{30}=A_{30}'b_{30}'C_{30}ASA+A_{30}'b_{30}C_{30}'ASA$$
$${}_0A_{30}=A_{30}b_{30}'C_{30}ASA+A_{30}b_{30}C_{30}'ASA$$
$${}_1A_{31}=A_{31}'A_{30}'b_{30}C_{30}'ASA+A_{32}A_{31}'A_{30}b_{30}'C_{30}ASA$$
$${}_0A_{31}=A_{31}A_{30}b_{30}'C_{30}ASA+A_{32}'A_{31}A_{30}'b_{30}C_{30}'ASA$$
$${}_1A_{32}=A_{32}'A_{31}A_{30}'b_{30}C_{30}ASA$$
$${}_0A_{32}=A_{31}'A_{30}b_{30}'C_{30}ASA$$
$$\begin{aligned}{}_1Ov=&A_{32}'A_{31}'A_{30}b_{30}'C_{30}ASC\\&+A_{32}A_{31}'A_{30}b_{30}C_{30}'ASC\\&+A_{31}A_{30}(T_6ASS)\\&+A_{31}'A_{30}(T_6ASS)\end{aligned}$$

The carry $C_{30}$ to the sign and overflow logic network 30 is produced by the function $$C_{30}=A_{29}C_{29}+A_{29}b_{29}+C_{29}b_{29}$$
$$C_{30}'=(A_{29}C_{29}+A_{29}b_{29}+C_{29}b_{29})'$$

The extension to the A-register, comprising stages $Q_{30}$ to $Q_{21}$ of the Q-register, cooperates with the extension to the M-register, comprising stages $Q_{11}$ to $Q_{20}$ of the Q-register, and the adder 20 to provide an extended product as the multiplicand is shifted to the right and added to the contents of the extended accumulator. As noted hereinbefore, the adder 20 is a full 10-bit parallel adder which produces the sum digits in accordance with the following equations:

$$\begin{aligned}{}_1Q_{30}=&Q_{30}'Q_{11}'Cm_{10}McASQ\\&+Q_{30}'Q_{11}'Cm_{10}'McASQ\\&+T_0PTG'\end{aligned}$$
$$\begin{aligned}{}_0Q_{30}=&Q_{30}Q_{11}'Cm_{10}McASQ\\&+Q_{30}Q_{11}Cm_{10}'McASQ\\&+T_0QDE\end{aligned}$$
$$\begin{aligned}{}_1Q_{29}=&Q_{29}'Q_{12}Cm_9'McASQ\\&+Q_{29}'Q_{12}'Cm_9McASQ\end{aligned}$$
$$\begin{aligned}{}_0Q_{29}=&Q_{29}Q_{12}'Cm_9McASQ\\&+Q_{29}Q_{12}Cm_9'McASQ\end{aligned}$$
$$\begin{aligned}{}_1Q_{28}=&Q_{28}'Q_{13}'Cm_8McASQ\\&+Q_{28}'Q_{13}Cm_8'McASQ\end{aligned}$$
$$\begin{aligned}{}_0Q_{28}=&Q_{28}Q_{13}'Cm_8McASQ\\&+Q_{28}Q_{13}Cm_8'McASQ\end{aligned}$$
$$\begin{aligned}{}_1Q_{27}=&Q_{27}'Q_{14}'Cm_7McASQ\\&+Q_{27}'Q_{14}Cm_7'McASQ\end{aligned}$$
$$\begin{aligned}{}_0Q_{27}=&Q_{27}Q_{14}'Cm_7McASQ\\&+Q_{27}Q_{14}Cm_7'McASQ\end{aligned}$$
$$\begin{aligned}{}_1Q_{26}=&Q_{26}'Q_{15}'Cm_6McASQ\\&+Q_{26}'Q_{15}Cm_6'McASQ\end{aligned}$$
$$\begin{aligned}{}_0Q_{26}=&Q_{26}Q_{15}'Cm_6McASQ\\&+Q_{26}Q_{15}Cm_6'McASQ\end{aligned}$$
$$\begin{aligned}{}_1Q_{25}=&Q_{25}'Q_{16}'Cm_5McASQ\\&+Q_{25}'Q_{16}Cm_5'McASQ\end{aligned}$$
$$\begin{aligned}{}_0Q_{25}=&Q_{25}Q_{16}'Cm_5McASQ\\&+Q_{25}Q_{16}Cm_5'McASQ\end{aligned}$$
$$\begin{aligned}{}_1Q_{24}=&Q_{24}'Q_{17}'Cm_4McASQ\\&+Q_{24}'Q_{17}Cm_4'McASQ\end{aligned}$$
$$\begin{aligned}{}_0Q_{24}=&Q_{24}Q_{17}'Cm_4McASQ\\&+Q_{24}Q_{17}Cm_4'McASQ\end{aligned}$$
$$\begin{aligned}{}_1Q_{23}=&Q_{23}'Q_{18}'Cm_3McASQ\\&+Q_{23}'Q_{18}Cm_3'McASQ\end{aligned}$$
$$\begin{aligned}{}_0Q_{23}=&Q_{23}Q_{18}'Cm_3McASQ\\&+Q_{23}Q_{18}Cm_3'McASQ\end{aligned}$$
$$\begin{aligned}{}_1Q_{22}=&Q_{22}'Q_{19}'Cm_2McASQ\\&+Q_{22}'Q_{19}Cm_2'McASQ\end{aligned}$$
$$\begin{aligned}{}_0Q_{22}=&Q_{22}Q_{19}'Cm_2McASQ\\&+Q_{22}Q_{19}Cm_2'McASQ\end{aligned}$$
$$\begin{aligned}{}_1Q_{21}=&Q_{21}'Q_{20}'Cm_1McASQ\\&+Q_{21}'Q_{20}Cm_1'McASQ\end{aligned}$$
$$\begin{aligned}{}_0Q_{21}=&Q_{21}Q_{20}'Cm_1McASQ\\&+Q_{21}Q_{20}Cm_1'McASQ\end{aligned}$$

The multiplicand is shifted from the M-register into the extension thereto in accordance with the following logic equations:

$${}_1Q_{11}=M_1MTQ$$
$${}_0Q_{11}=(M_1MTQ)'QDE$$
$${}_1Q_i=Q_{i-1}LSQ$$
$${}_0Q_i=(Q_{i-1}LSQ)'QDE \text{ where } {}_i=12, 13, 14 \ldots 20$$

Thus the ten binary digits in bit positions $Q_{11}$ to $Q_{20}$ are added to bit positions $Q_{30}$ to $Q_{21}$ each time the multiplicand is added to the partial product in the accumulator under the control of multiplier digits in the I-register. The carry signals $Cm_1$ to $Cm_{11}$ are generated by the adder 20 in accordance with the following logic equations:

$$Cm_1=Q_{10}$$
$$\begin{aligned}Cm_2=&Q_{21}Q_{20}\\&+(Q_{21}+Q_{20})Cm_1\end{aligned}$$
$$\begin{aligned}Cm_3=&Q_{22}Q_{19}\\&+(Q_{22}+Q_{19})Q_{21}Q_{20}\\&+(Q_{22}+Q_{19})(Q_{21}+Q_{22})Cm_1\end{aligned}$$
$$\begin{aligned}Cm_4=&Q_{23}Q_{18}\\&+(Q_{23}+Q_{18})Q_{22}Q_{19}\\&+(Q_{23}+Q_{18})(Q_{22}+Q_{19})Q_{21}Q_{20}\\&+(Q_{23}+Q_{18})(Q_{22}+Q_{19})(Q_{21}+Q_{20})Cm_1\end{aligned}$$
$$\begin{aligned}Cm_5=&Q_{24}Q_{17}\\&+(Q_{24}+Q_{17})Q_{23}Q_{18}\\&+(Q_{24}+Q_{17})(Q_{23}+Q_{18})Q_{22}Q_{19}\\&+(Q_{24}+Q_{17})(Q_{23}+Q_{18})(Q_{22}+Q_{19})Q_{21}Q_{20}\\&+(Q_{24}+Q_{17})(Q_{23}+Q_{18})(Q_{22}+Q_{19})(Q_{21}+Q_{20})\\&\quad Cm_1\end{aligned}$$
$$\begin{aligned}Cm_6=&Q_{25}Q_{16}\\&+(Q_{25}Q_{16})Q_{24}Q_{17}\\&+(Q_{25}+Q_{16})(Q_{24}+Q_{17})Q_{23}Q_{18}\\&+(Q_{25}+Q_{16})(Q_{24}+Q_{17})(Q_{23}+Q_{18})Q_{22}Q_{19}\\&+(Q_{25}+Q_{16})(Q_{24}+Q_{17})(Q_{23}+Q_{18})(Q_{22}+Q_{19})\\&\quad Q_{21}Q_{20}\\&+(Q_{25}+Q_{16})(Q_{24}+Q_{17})(Q_{23}+Q_{18})(Q_{22}+Q_{19})\\&\quad(Q_{21}+Q_{20})Cm_1\end{aligned}$$
$$\begin{aligned}Cm_7=&Q_{26}Q_{15}\\&+(Q_{26}+Q_{15})Cm_6\end{aligned}$$
$$\begin{aligned}Cm_8=&Q_{27}Q_{14}\\&+(Q_{27}+Q_{14})Q_{26}Q_{15}\\&+(Q_{27}+Q_{14})(Q_{26}+Q_{15})Cm_6\end{aligned}$$
$$\begin{aligned}Cm_9=&Q_{28}Q_{13}\\&+(Q_{28}+Q_{13})Q_{27}Q_{14}\\&+(Q_{28}+Q_{13})(Q_{27}+Q_{14})Q_{26}Q_{15}\\&+(Q_{28}+Q_{13})(Q_{27}+Q_{14})(Q_{26}+Q_{15})Cm_6\end{aligned}$$
$$\begin{aligned}Cm_{10}=&Q_{29}Q_{12}\\&+(Q_{29}+Q_{12})Q_{28}Q_{13}\\&+(Q_{29}+Q_{12})(Q_{28}+Q_{13})Q_{27}Q_{14}\\&+(Q_{29}+Q_{12})(Q_{28}+Q_{13})(Q_{27}+Q_{14})Q_{26}Q_{15}\\&+(Q_{29}+Q_{12})(Q_{28}+Q_{13})(Q_{27}+Q_{14})(Q_{26}+Q_{15})\\&\quad Cm_6\end{aligned}$$
$$\begin{aligned}Cm_{11}=&Q_{30}Q_{11}\\&+(Q_{30}+Q_{11})Q_{29}Q_{12}\\&+(Q_{30}+Q_{11})(Q_{29}+Q_{12})Q_{28}Q_{13}\\&+(Q_{30}+Q_{11})(Q_{29}+Q_{12})(Q_{28}+Q_{13})Q_{27}Q_{14}\\&+(Q_{30}+Q_{11})(Q_{29}+Q_{12})(Q_{28}+Q_{13})(Q_{27}+Q_{14})\\&\quad Q_{26}Q_{15}\\&+(Q_{30}+Q_{11})(Q_{29}+Q_{12})(Q_{28}+Q_{13})(Q_{27}+Q_{14})\\&\quad(Q_{26}+Q_{15})Cm_6\end{aligned}$$

The carry $Cm_{11}$ from the most significant binary position of the adder 20 is transmitted to the unassimilated carry adder 10 as a carry into the least significant bit position therein. Thus, the carry $Cm_{11}$ is the carry signal $C_1$ in the logic equations for the unassimilated carry adder 10.

To round off the product in a conventional manner, a bit 1 is inserted into bit position $Q_{30}$ at time $T_0$ as noted hereinbefore so that a bit 1 is added into the retained portion of the product as a carry signal $Cm_{11}$ in the course of adding $Q_{11}$ to $Q_{30}$.

The least significant carry signal $Cm_1$ derived from the buffer flip-flop $Q_{10}$ provides the compensation described hereinbefore in response to the truncation error compensation logic network 40 in accordance with the following equations:

$$ {}_1Q_{10}=Q_{20}I_{29}MTQT_{26}' $$
$$ {}_0Q_{10}=(Q_{20}I_{29}MTQT_{26}')'QDE $$

The control signal MTQ shifts the discarded binary digits of the multiplicand from the least significant bit position $Q_{20}$ of the extension to the M-register into the buffer flip-flop $Q_{10}$ only if the corresponding less significant multiplier digit to be transferred from $I_{29}$ to the control flip-flop $Mc$ is a bit 1. The clock timing signal $T_{26}'$ is added to the control signal MTQ in order to inhibit a transfer from $Q_{20}$ to $Q_{10}$ during the clock time $T_{26}$. Thus the truncation error compensation consists of adding to the least significant bit position of the truncated product at each clock time the successive products $Q_{20}I_{29}$ except at the clock time $T_{26}$ selected arbitrarily. In providing a truncated product with truncation error compensation in this manner, the adder 20 could just as well be implemented as an unassimilated carry adder, as noted hereinbefore, but that would require providing ten additional flip-flops for an extension to the C-register solely for the operation of multiplication without a significant increase in speed over that provided by a 10 bit full parallel adder. Likewise, the unassimilated carry adder 10 could be implemented as a full 30 bit parallel adder but to achieve the speed of the unassimilated carry adder, the expense incurred in avoiding sequential generation and propagation of carries would be significant.

Once the truncated product has been formed with truncation error compensation and round off, the rounded product may be taken from the accumulator, the A and C-registers. As noted hereinbefore, assimilation of the carries in the C-register is performed automatically when the next instruction to be executed requires it. The assimilation as effectively accomplished by the three phase process of adding zero to the accumulator under the control of the $Sc$ and $Mc$ flip-flops while the $Sc$ flip-flop is set equal to 1 and the $Mc$ flip-flop is set equal to 0, performing the ripple function described hereinbefore in the C-register in accordance with the general equation ${}_1C_i+1$ equal $A_i(C_i+{}_1C_i)$; and, adding 0 to the accumulator as in the first phase. The C-register is cleared by setting it equal to 0 during the last phase.

If a rounded product is not desired, a control signal PTG′ inhibits setting the stage $Q_{30}$ equal to 1 at clock time $T_0$. That control signal is derived from a tag bit in the instruction to multiply which, upon being decoded, transmits the signal PTG if a rounded product is not desired. Otherwise, $Q_{30}$ is initially set equal to 1 by a block timing pulse $T_0$ to automatically provide for a rounded product.

While the principles of the invention have now been made clear in an illustrative embodiment, there will be immediately obvious to those skilled in the art many modifications which are particularly adapted for specific applications without departing from those principles. The following claims are herefore intended to cover and embrace any such modifications, within the limits only of the true spirit and scope of the invention.

What is claimed is:

1. A system for deriving the product of a binary multiplier and a binary multiplicand comprising
- a group of timing signals, one signal for each multiplier digit,
- a shift register for storing said multiplicand including means for scaling said multiplicand in response to said timing signals by repeatedly shifting it in such a direction as to divide it by two once for each timing signal,
- means for sequentially scanning digits of said multiplier in order from the most significant to the least significant digit, one digit being scanned in response to each timing signal,
- and accumulating means for adding said scaled multiplicand in said shift register to a partial product stored therein in response to each multiplier digit scanned that is equal to one.

2. A system for deriving the product of a binary multiplier and a binary multiplicand comprising
- a group of timing signals, one signal for each multiplier digit,
- a shift register for storing said multiplicand including means for scaling said multiplicand in response to said timing signals by repeatedly shifting it in such a direction as to divide it by two once for each timing signal,
- means for sequentially scanning digits of said multiplier in order from the most significant to the least significant digit, one digit being scanned in response to each timing signal,
- accumulating means for adding said scaled multiplicand in said shift register to a partial product stored therein in response to each multiplier digit scanned that is equal to one,
- and round-off means for adding a binary digit one in the least significant digit position of said accumulating means in response to one of said timing signals.

3. In a system for deriving the truncated product of a binary multiplicand having $n$ digits and a binary multiplier having $k$ digits, the combination comprising
- a group of timing signals, one signal for each multiplier digit,
- a shift register having $n+s$ binary digit positions for storing said multiplicand, where $n+s$ is less than $n+k$, said multiplicand being initially stored in the most significant $n$ digit positions, said register including means for scaling said multiplicand in response to said timing signals by repeatedly shifting it to positions of lower significance, one digit position for each timing signal,
- means for sequentially scanning digits of said multiplier in order from the most significant to the least significant digit, one digit being scanned in response to each timing signal,
- and accumulating means for adding said scaled multiplicand in said shift register to a partial product of $n+s$ binary digits stored therein in response to each multiplier digit scanned that is equal to one.

4. In a system for deriving a rounded $n$-digit product of a binary multiplicand having $n$ digits and a binary multiplier having $k$ digits, the combination comprising
- a group of timing signals, one signal for each multiplier digit,
- a shift register having $n+s$ binary digit positions for storing said multiplicand, where $n+s$ is less than $n+k$, said multiplicand being initially stored in the most significant $n$ digit positions, said register including means for scaling said multiplicand in response to said timing signals by repeatedly shifting it to positions of lower significance, one digit position for each timing signal,
- means for sequentially scanning digits of said multiplier in order from the most significant to the least significant digit, one digit being scanned in response to each timing signal, accumulating means for adding said scaled multiplicand in said shift register to a partial product of $n+s$ binary digits stored therein in response to each multiplier digit scanned that is equal to one, and round-off means for adding a binary digit one in the least significant digit position of the $n$ most significant positions of said accumulating means in response to one of said timing signals.

5. In a system for deriving the truncated product of a binary multiplier having $n$ digits $a_1$ to $a_n$ and a binary multiplicand having $k$ digits $b_1$ to $b_k$, where the subscripts 1 to $n$ and 1 to $k$ represent the multiplier and multiplicand digits in decreasing order of significance, the combination comprising a group of $n$ timing signals, one for each multiplier digit, a shift register having $n+s$ binary digit positions for storing said multiplicand, where $n+s$ is less than $n+k$, said multiplicand being initially stored in the most significant $n$ digit positions, said register including means for scaling said multiplicand in response to said timing signals by repeatedly shifting it to positions of lower significance, one digit position for each timing signal, means for sequentially scanning digits of said multiplier in order from the most significant to the least significant digit, one digit being scanned in response to each timing signal, accumulating means for adding said scaled multiplicand in said shift register to a partial product of $n+s$ binary digits stored therein in response to each multiplier digit scanned that is equal to one, and truncation error compensation means for adding at least some of the successive products $a_{s+1}b_k$, $a_{s+2}b_{k-1}$, $a_{s+3}b_{k-2}$ . . . $a_{n-2}b_{s+3}$, $a_{n-1}b_{s+2}$, $a_nb_{s+1}$ to the least significant bit position of the corresponding partial product in response to said timing signals.

6. In a system for deriving the truncated product of a binary multiplier having $n$ digits $a_1$ to $a_n$ and a binary multiplicand having $k$ digits $b_1$ to $b_k$, where the subscripts 1 to $n$ and 1 to $k$ represent the multiplier and multiplicand digits in inverse order of significance, the combination comprising a group of $n$ timing signals, one for each multiplier digit, a shift register having $n+s$ binary digit positions for storing said multiplicand, where $n+s$ is less than $n+k$, said multiplicand being initially stored in the most significant $n$ digit positions, said register including means for scaling said multiplicand in response to said timing signals by repeatedly shifting it to positions of lower significance, one digit position for each timing signal, means for sequentially scanning digits of said multiplier in order from the most significant to the least significant digit, one digit being scanned in response to each timing signal, accumulating means for adding said scaled multiplicand in said shift register to a partial product of $n+s$ binary digits stored therein in response to each multiplier digit scanned that is equal to one, and truncation error compensation means for adding each of the successive products $a_{s+1}b_k$, $a_{s+2}b_{k-1}$, $a_{s+3}b_{k-2}$ . . . $a_{n-2}b_{s+3}$, $a_{n-1}b_{s+2}a_nb_{s+1}$ to the least significant bit position of the corresponding partial product except one arbitrarily selected in response to $n-s$ of said timing signals.

7. In a system for deriving the truncated product of a binary multiplier having $n$ digits $a_1$ to $a_n$ and a binary multiplicand having $k$ digits $b_1$ to $b_k$, where the subscripts 1 to $n$ and 1 to $k$ represent the multiplier and multiplicand digits in inverse order of significance, the combination as defined in claim 6 including round-off means for adding a binary digit one in the least significant digit position of the $n$ most significant positions of said accumulator in response to one of said timing signals.

8. A system for deriving the product of a binary multiplier and a binary multiplicand, where said multiplier and multiplicand are expressed in the 2's complement form for negative values, comprising a group of timing signals, one signal for each multiplier digit, a shift register for storing said multiplicand including means for scaling said multiplicand in response to said timing signals by repeatedly shifting it in such a direction as to divide it by two once for each timing signal, each time spreading the sign digit for negative values of the multiplicand, means for sequentially scanning digits of said multiplier in order from the most significant to the least significant digit, one digit being scanned in response to each timing signal, accumulating means for adding said scaled multiplicand in said shift register to a partial product stored therein in response to each multiplier digit scanned that is equal to one, the sum and carry digits of said partial product being separately stored in an unassimiliated form, said accumulator including three indicator digits having the weighted values of +1 for the sign position, —2 for the next most significant position, and —4 for the most significant position, the range of a partial product stored therein at a given time being provided by the algebraic sum of said indicator digits, a +1 carry into said sign position which would result upon assimilation of carries at said given time and a —1 sign digit for negative values of said multiplicand, and means for indicating an overflow when said range of a partial product stored in said accumulator is equal to or greater than +2, or equal to or less than —4.

9. A system for deriving the product of a binary multiplier and a binary multiplicand, where said multiplier and multiplicand are expressed in the 2's complement form for negative values, comprising a group of timing signals, one signal for each multiplier digit, a shift register for storing said multiplicand including means for scaling said multiplicand in response to said timing signals by repeatedly shifting it in such a direction as to divide it by two once for each timing signal, each time spreading the sign digit for negative values of the multiplicand, means for sequentially scanning digits of said multiplier in order from the most significant to the least significant digit, one digit being scanned in response to each timing signal, accumulating means for adding said scaled multiplicand in said shift register to a partial product stored therein in response to each multiplier digit scanned that is equal to one, the sum and carry digits of said partial product being separately stored in an unassimiliated form, said accumulator including three indicator digits having the weighted values of +1 for the sign position, —2 for the next most significant position, and —4 for the most significant position, the range of a partial product stored therein at a given time being provided by the algebraic sum of said indicator digits, a +1 carry into said sign position which would result upon assimilation of carries at said given time and a —1 sign digit for negative values of said multiplicand, means for indicating an overflow when said range of a partial product stored in said accumulator is equal to or greater than +2 or equal to or less than —4, and round-off means for adding a binary digit one in the least significant digit position of said accumulating means in response to one of said timing signals.

10. In a system for deriving the truncated product of a binary multiplicand having $n$ digits and a binary multiplier having $k$ digits, where said multiplier and multiplicand are expressed in the 2's complement form for negative values, the combination comprising a group of timing signals, one signal for each multiplier digit, a shift register having $n+s$ binary digit positions for storing said multiplicand, where $n+s$ is less than $n+k$, said multiplicand being initially stored in the most significant $n$ digit positions, said register including means for scaling said multiplicand in response to said timing signals by repeatedly shifting it to positions of lower significance, one digit position for each timing signal, each time spreading the sign digit for negative values of the multiplicand, means for sequentially scanning digits of said multiplier in order from the most significant to the least significant digit, one digit being scanned in response to each timing signal, accumulating means for adding said scaled multiplicand in said shift register to a partial product of $n+s$ binary digits stored therein in response to each multiplier digit scanned that is equal to one, the sum and carry digits of said partial product being separately stored in an unassimilated form, said accumulator including three indicator digits having the weighted values of $+1$ for the sign position, $-2$ for the next most significant position, and $-4$ for the most significant position, the range of a partial product stored therein at a given time being provided by the algebraic sum of said indicator digits, a $+1$ carry into said sign position which would result upon assimilation of carries at said given time and a $-1$ sign digit for negative values of said multiplicand, and means for indicating an overflow when said range of a partial product stored in said accumulator is equal to or greater than $+2$, or equal to or less than $-4$.

11. In a system for deriving a rounded $n$-digit product of a binary multiplicand having $n$ digits and a binary multiplier having $k$ digits, where said multiplier and multiplicand are expressed in the 2's complement form for negative values, the combination comprising a group of timing signals, one signal for each multiplier digit, a shift register having $n+s$ binary digit positions for storing said multiplicand, where $n+s$ is less than $n+k$, said multiplicand being initially stored in the most significant $n$ digit positions, said register including means for scaling said multiplicand in response to said timing signals by repeatedly shifting it to positions of lower significance, one digit position for each timing signal, means for sequentially scanning digits of said multiplier in order from the most significant to the least significant digit, one digit being scanned in response to each timing signal, each time spreading the sign digit for negative values of the multiplicand, accumulating means for adding said scaled multiplicand in said shift register to a partial product of $n+s$ binary digits stored therein in response to each multiplier digit scanned that is equal to one, the sum and carry digits of said partial product being separately stored in an unassimilated form, said accumulator including three indicator digits having the weighted values of $+1$ for the sign position, $-2$ for the next most significant position, and $-4$ for the most significant position, the range of a partial product stored therein at a given time being provided by the algebraic sum of said indicator digits, a $+1$ carry into said sign position which would result upon assimilation of carries at said given time and a $-1$ sign digit for negative values of said multiplicand, and round-off means for adding a binary digit one in the least significant digit position of the $n$ most significant positions of said accumulating means in response to one of said timing signals.

12. In a system for deriving the truncated product of a binary multiplier having $n$ digits $a_1$ to $a_n$ and a binary multiplicand having $k$ digits $b_1$ to $b_k$, where the subscripts 1 to $n$ and 1 to $k$ represent the multiplier and multiplicand digits in decreasing order of significance, where said multiplier and multiplicand are expressed in the 2's complement form for negative values, the combination comprising a group of $n$ timing signals, one for each multiplier digit, a shift register having $n+s$ binary digit positions for storing said multiplicand, where $n+s$ is less than $n+k$, said multiplicand being initially stored in the most significant $n$ digit positions, said register including means for scaling said multiplicand in response to said timing signals by repeatedly shifting it to positions of lower significance, one digit position for each timing signal, means for sequentially scanning digits of said multiplier in order from the most significant to the least significant digit, one digit being scanned in response to each timing signal, each time spreading the sign digit for negative values of the multiplicand, accumulating means for adding said scaled multiplicand in said shift register to a partial product of $n+s$ binary digits stored therein in response to each multiplier digit scanned that is equal to one, the sum and carry digits of said partial product being separately stored in an unassimilated form, said accumulator including three indicator digits having the weighted values of $+1$ for the sign position, $-2$ for the next most significant position, and $-4$ for the most significant position, the range of a partial product stored therein at a given time being provided by the algebraic sum of said indicator digits, a $+1$ carry into said sign position which would result upon assimilation of carries at said given time and a $-1$ sign digit for negative values of said multiplicand, and truncation error compensation means for adding at least some of the successive products $a_{s+1}b_k$, $a_{s+2}b_{k-1}$, $a_{s+3}b_{k-2}$ . . . $a_{n-2}b_{s+3}$, $a_{n-1}b_{s+2}$, $a_nb_{s+1}$ to the least significant bit position of the corresponding partial product in response to said timing signals.

13. In a system for deriving the truncated product of a binary multiplier having $n$ digits $a_1$ to $a_n$ and a binary multiplicand having $k$ digits $b_1$ to $b_k$, where the subscripts 1 to $n$ and 1 to $k$ represent the multiplier and multiplicand digits in inverse order of significance, where said multiplier and multiplicand are expressed in the 2's complement form for negative values, the combination comprising a group of $n$ timing signals, one for each multiplier digit, a shift register having $n+s$ binary digit positions for storing said multiplicand, where $n+s$ is less than $n+k$, said multiplicand being initially stored in the most significant $n$ digit positions, said register including means for scaling said multiplicand in response to said timing signals by repeatedly shifting it to positions of lower significance, one digit position for each timing signal, means for sequentially scanning digits of said multiplier in order from the most significant to the least significant digit, one digit being scanned in response to each timing signal, accumulating means for adding said scaled multiplicand in said shift register to a partial product of $n+s$ binary digits stored therein in response to each multiplier digit scanned that is equal to one, the sum and carry digits of said partial product being separately stored in an unassimilated form, said accumulator including three indicator digits having the weighted values of $+1$ for the sign position, $-2$ for the next most significant position, and $-4$ for the most significant position, the range of a partial product stored therein at a given time being provided by the algebraic sum of said indicator digits, $a+1$ carry into said sign position which would result upon assimilation of carries at said given time and a $-1$ sign digit for negative values of said multiplicand, and truncation error compensation means for adding each of the successive products $a_{s+1}b_k$, $a_{s+2}b_{k-1}$, $a_{s+3}b_{k-2}$ . . . $a_{n-2}b_{s+3}$, $a_{n-1}b_{s+2}a_nb_{s+1}$ to the least significant bit position of the corresponding partial product except one arbitrarily selected in response to $n-s$ of said timing signals.

14. In a system for deriving the truncated product of a binary multiplier having $n$ digits $a_1$ to $a_n$ and a binary multiplicand having $k$ digits $b_1$ to $b_k$, where the subscripts 1 to $n$ and 1 to $k$ represent the multiplier and multiplicand digits in inverse order of significance, the combination as defined by claim 13 including round-off means for adding a binary digit one in the least significant digit position of the $n$ most significant positions of said accumulator in response to one of said timing signals.

15. A system for deriving the product of a binary multiplier and a binary multiplicand, where said multiplier and multiplicand are expressed in the 2's complement form for negative values, comprising a group of timing signals, one signal for each multiplier digit, a shift register for storing said multiplicand including means for scaling said multiplicand in response to said timing signals by repeatedly shifting it in such a direction as to divide it by two once for each timing signal, each time spreading the sign digit for negative values of the multiplicand, means for sequentially scanning digits of said multiplier in order from the most significant to the least significant digit, one digit being scanned in response to each timing signal, and accumulating means for adding said scaled multiplicand in said shift register to a partial product stored therein in response to each multiplier digit scanned that is equal to one, the sum and carry digits of said partial product being separately stored in an unassimilated form, said accumulator including three indicator digits having the weighted values of $+1$ for the sign position, $-2$ for the next most significant position, and $-4$ for the most significant position, the range of a partial product stored therein at a given time being provided by the algebraic sum of said indicator digits, a $+1$ carry into said sign position which would result upon assimilation of carries at at said given time and a $-1$ sign digit for negative values of said multiplicand.

16. A system for deriving the product of a binary multiplier and a binary multiplicand, where said multiplier and multiplicand are expressed in the 2's complement form for negative values, comprising a group of timing signals, one signal for each multiplier digit, a shift register for storing said multiplicand including means for scaling said multiplicand in response to said timing signals by repeatedly shifting it in such a direction as to divide it by two once for each timing signal, each time spreading the sign digit for negative values of the multiplicand, means for sequentially scanning digits of said multiplier in order from the most significant to the least significant digit, one digit being scanned in response to each timing signal, accumulating means for adding said scaled multiplicand in said shift register to a partial product stored therein in response to each multiplier digit scanned that is equal to one, the sum and carry digits of said partial product being separately stored in an unassimilated form, said accumulator including three indicator digits having the weighted values of $+1$ for the sign position, $-2$ for the next most significant poistion, and $-4$ for the most significant position, the range of a partial product stored therein at a given time being provided by the algebraic sum of said indicator digits, a $+1$ carry into said sign position which would result upon assimilation of carries at said given time and a $-1$ sign digit for negative values of said multiplicand, and round-off means for adding a binary digit one in the least significant digit position of said accumulating means in response to one of said timing signals.

17. In a system for deriving the truncated product of a binary multiplicand having $n$ digits and a binary multiplier having $k$ digits, where said multiplier and multiplicand are expressed in the 2's complement form for negative values, the combination comprising a group of timing signals, one signal for each multiplier digit, a shift register having $n+s$ binary digit positions for storing said multiplicand, where $n+s$ is less than $n+k$, said multiplicand being initially stored in the most significant $n$ digit positions, said register including means for scaling said multiplicand in response to said timing signals by repeatedly shifting it to positions of lower significance, one digit position for each timing signal, each time spreading the sign digit for negative values of the multiplicand, means for sequentially scanning digits of said multiplier in order from the most significant to the least significant digit, one digit being scanned in response to each timing signal, and accumulating means for adding said scaled multiplicand in said shift register to a partial product of $n+s$ binary digits stored therein in response to each multiplier digit scanned that is equal to one, the sum and carry digits of said partial product being separately stored in an unassimilated form, said accumulator including three indicator digits having the weighted values of $+1$ for the sign position, $-2$ for the next most significant position, and $-4$ for the most significant position, the range of a partial product stored therein at a given time being provided by the algebraic sum of said indicator digits, a $+1$ carry into said sign position which would result upon assimilation of carries at said given time and a $-1$ sign digit for negative values of said multiplicand.

18. In a system for deriving a rounded $n$-digit product of a binary multiplicand having $n$ digits and a binary multiplier having $k$ digits, where said multiplier and multiplicand are expressed in the 2's complement form for negative values, the combination comprising a group of timing signals, one signal for each multiplier digit, a shift register having $n+s$ binary digit positions for storing said multiplicand, where $n+s$ is less than $n+k$, said multiplicand being initially stored in the most significant $n$ digit positions, said register including means for scaling said multiplicand in response to said timing signals by repeatedly shifting it to positions of lower significance, one digit position for each timing signal, means for sequentially scanning digits of said multiplier in order from the most significant to the least significant digit one digit, being scanned in response to each timing signal, each time spreading the sign digit for negative values of the multiplicand, accumulating means for adding said scaled multiplicand in said shift register to a partial product of $n+s$ binary digits stored therein in response to each multiplier digit scanned that is equal to one, the sum and carry digits of said partial product being separately stored in an unassimilated form, said accumulator including three indicator digits having the weighted values of $+1$ for the sign position, $-12$ for the next most significant position, and −4 for the most significant position, the range of a partial product stored therein a a given time being provided by the algebraic sum of said indicative digits, a +1 carry into said sign position which would result upon assimilation of carries at said given time and a −1 sign digits for negative values of said multiplicand, means for indicating an overflow when said range of a partial product stored in said accumulator is equal to or greater than +2, or equal to or less than −4, and round-off means for adding a binary digit one in the least significant digit position of the $n$ most significant positions of said accumulating means in response to one of said timing signals.

19. In a system for deriving the truncated product of a binary multiplier having $n$ digits $a_1$ to $a_n$ and a binary multiplicand having $k$ digits $b_1$ to $b_k$, where the subscripts 1 to $n$ and 1 to $k$ represent the multiplier and multiplicand digits in decreasing order of significance, where said multiplier and multiplicand are expressed in the 2's complement form for negative values, the combination comprising a group of $n$ timing signals, one for each multiplier digit, a shift register having $n+s$ binary digit positions for storing said multiplicand, where $n+s$ is less than $n+k$, said multiplicand being initially stored in the most significant $n$ digit positions, said register including means for scaling said multiplicand in response to said timing signals by repeatedly shifting it to positions of lower significance, one digit position for each timing signal, means for sequentially scanning digits of said multiplier in order from the most significant to the least significant digit, one digit being scanned in response to each timing signal, each time spreading the sign digit for negative values of the multiplicand, accumulating means for adding said scaled multiplicand in said shift register to a partial product of $n+s$ binary digits stored therein in response to each multiplier digit scanned that is equal to one, the sum and carry digits of said partial product being separately stored in an unassimilated form, said accumulator including three indicator digits having the weighted values of +1 for the sign position, −2 for the next most significant position, and −4 for the most significant position, the range of a partial product stored therein at a given time being provided by the algebraic sum of said indicator digits, a +1 carry into said sign position which would result upon assimilation of carries at said given time and a −1 sign digit for negative values of said multiplicand, means for indicating an overflow when said range of a partial product stored in said accumulator is equal to or greater than +2, or equal to or less than −4, and truncation error compensation means for adding at least some of the successive products $a_{s+s1}b_k$, $a_{+2}b_{k-1}$, $a_{+3}b_{k-2}$ . . . $a_{n-2}b_{s+3}$, $a_{n-1}b_{s+2}$, $a_nb_{s+1}$ $a_{+2}b_{+1}$, $a_{+3}b_{k-2}$ . . . $a_{n-2}b_{s+3}$, $a_{n-1}b_{s+2}$, $a_nb_{s+1}$ to the least significant bit position of the corresponding partial product in response to said timing signals.

20. In a system for deriving the truncated product of a binary multiplier having $n$ digits $a_1$ to $a_n$ and a binary multiplicand having $k$ digits $b_1$ to $b_k$, where the subscripts 1 to $n$ and 1 to $k$ represent the multiplier and multiplicand digits in inverse order of significance, where said multiplier and multiplicand are expressed in the 2's complement form for negative values, the combination comprising a group of $n$ timing signals, one for each multiplier digit, a shift register having $n+s$ binary digit positions for storing said multiplicand, where $n+s$ is less than $n+k$, said multiplicand being initially stored in the most significant $n$ digit positions, said register including means for scaling said multiplicand in response to said timing signals by repeatedly shifting it to positions of lower significance, one digit position for each timing signal, means for sequentially scanning digits of said multiplier in order from the most significant to the least significant digit, one digit being scanned in response to each timing signal, accumulating means for adding said scaled multiplicand in said shift register to a partial product of $n+s$ binary digits stored therein in response to each multiplier digit scanned that is equal to one, the sum and carry digits of said partial product being separately stored in an unassimilated form, said accumulator including three indicator digits having the weighted values of +1 for the sign position, −2 for the next most significant position, and −4 for the most significant position, the range of a partial product stored therein at a given time being provided by the algebraic sum of said indicator digits, a +1 carry into said sign position which would result upon assimilation of carries at said given time and a −1 sign digit for negative values of said multiplicand, means for indicating an overflow when said range of a partial product stored in said accumulator is equal to or greater than +2, or equal to or less than −4, and truncation error compensation means for adding each of the successive products $a_{s+1}b_k$, $a_{s+2}b_{k-1}$, $a_{s+3}b_{k-2}$ . . . $a_{n-2}b_{s+3}$, $a_{n-1}b_{s+2}$, $a_nb_{s+1}$ to the least significant bit position of the corresponding partial product except one arbitrarily selected in response to $n-s$ of said timing signals.

No references cited.

MALCOLM A. MORRISON, *Primary Examiner.*

M. SPIVAK, *Assistant Examiner.*